Oct. 20, 1931.  J. J. BACON  1,828,636
MACHINE FOR MANUFACTURING RECEPTACLES
Filed Sept. 2, 1930  2 Sheets-Sheet 2
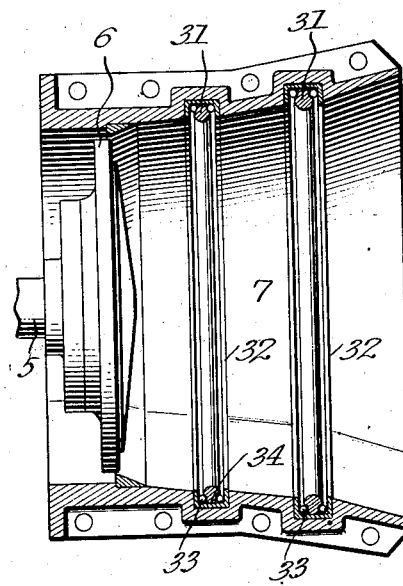
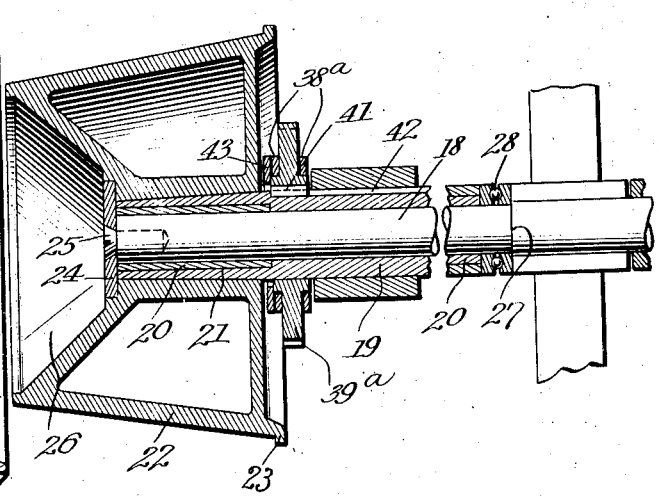
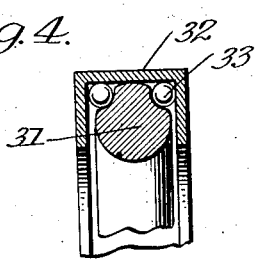
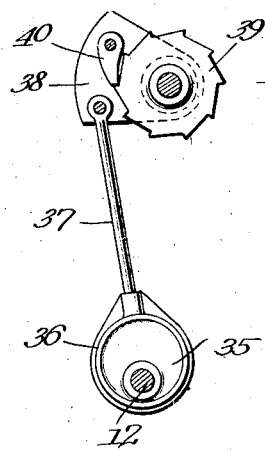
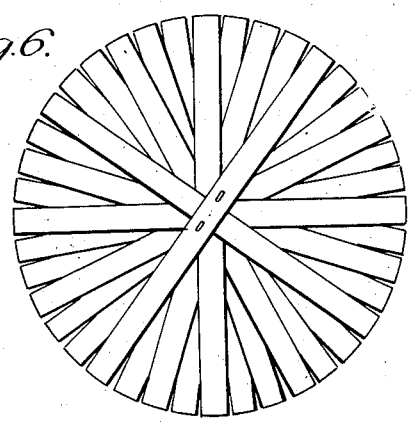
Inventor
John J. Bacon
By Richard K. Stevens
Attorney Patented Oct. 20, 1931

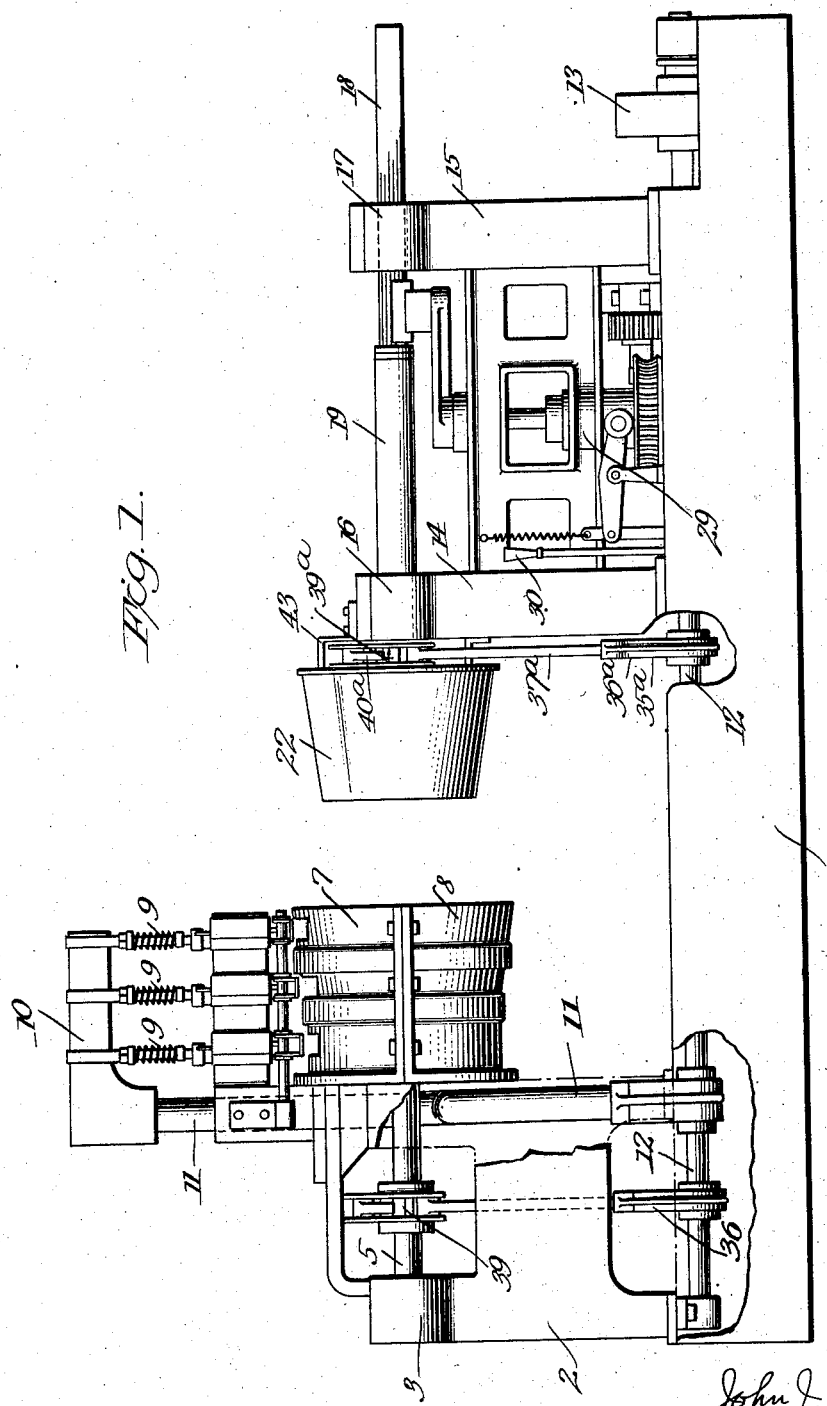

1,828,636

UNITED STATES PATENT OFFICE

JOHN J. BACON, OF GASPORT, NEW YORK

MACHINE FOR MANUFACTURING RECEPTACLES

Application filed September 2, 1930. Serial No. 479,377.

This invention relates to a machine for the manufacture of receptacles, and more particularly to a machine for folding staves and applying hoops thereto for the manufacture of baskets and the like.

For a number of years baskets have been used for the purpose of retaining fruits and vegetables during handling, and particularly during the period of marketing which involves the moving and stacking of the produce during both storage and shipment. It has been found that such baskets have to be sufficiently rigid to permit the handling in storage and shipment without sagging or warping with the resultant crushing or bruising of the produce. Furthermore, the baskets must be sufficiently rigid to permit the handling and movement on numerous occasions without the destruction or splintering of the staves or hoops thereof.

In order that the baskets be sufficiently rigid hoops have been applied thereto wherever necessitated by the strain, and it has been found that baskets of the necessary rigidity and of sufficiently long life could be manufactured at relatively low cost when manufactured in large numbers.

These baskets could be manufactured on mass production basis, by machines constructed to permit bending of the staves of a mat to the desired shape, with the application of hoops stapled thereto according to the nature and requirements of the particular form of basket being made.

Certain of the machines capable of producing baskets in large quantities, utilized relatively movable male and female forming members, which when brought together effected a forming of a mat of staves into the desired shape, and the intermittent rotation of the forms with the staves in the bent shape, for the application of hoops at the desired places along the baskets. The hoops were stapled to the formed staves by reciprocating stapling mechanisms as the hoops were stationary during the various rest periods of the intermittent rotation of the formers.

Difficulty has been experienced in the application of the hoops in that due to the intermittent rotation of the formers and the friction upon the basket effected by the feeding of the hoops, the staples were not regularly spaced along the hoops so that quite often an unstapled free end of one or more of the hoops will project outwardly. In using baskets improperly formed by the incorrect stapling of the hoops the projecting ends of the hoops often result in the premature destruction of the basket or result in injury to produce contained in baskets positioned nearby. So great has been the dissatisfaction in the use of baskets having extending hoop ends that it has been the practice to individually staple the extending portions of the hoops on separate machines although involving a great loss of time and the necessity of additional equipment. Furthermore the slippage of the basket in manufacture causes the distortion of the staves and the variance in the capacity of the baskets made on the same machine.

Due to the cheapness with which baskets of the type contemplated must be manufactured, the handling of the same in manufacture must be reduced to an absolute minimum. It is not practical to individually staple the free end of hoops, and machines have been devised with the view to avoiding the slippage and resultant improper stapling of hoops. It has been customary to utilize one or the other of the forming members as a driving member for effecting the intermittent rotation during the stapling operation. Even when the exterior basket bottom engaging member or plate is the driving member it must not project over the sides of the basket, or it will interfere with the attachment of the hoops particularly when a bottom hoop is employed. To overcome this difficulty and to permit a better stapling of the hoops freely rotating rings have been provided and positioned so that the male member forces the mat of staves through the same and into contact with the female or bottom engaging member, whereby the ring or rings as the case may be holds the mat closely against the form and tends to avoid slippage between the basket and form. However, such ring constructions were only partially effective and a further attempt to overcome the difficulty resulted in the use of a positively driven ring which was driven at the same speed and in fact by the basket bottom engaging or female member. Such further driving friction between the driven ring and the basket being formed further overcame the difficulty encountered by slippage, but I have found that the driven ring type of machine still resulted in many baskets being formed which required the further individual stapling of the hoops.

It is an object of the present invention to overcome the difficulties encountered in the applying of hoops to baskets in the process of manufacturing.

The invention contemplates the provision of a machine employing a former of the shape desired according to the shape of basket to be produced, a free ring or rings for maintaining the staves in tight contact with the former, and means for utilizing both the form and the tail plate which is to an extent the equivalent of the old female members as positively driven members for effecting the intermittent rotation of the basket without slippage in order that the last staple to be applied will be properly positioned with respect to each hoop end.

It is a further object of the present invention to cause tight contact of the bent basket staves against the former while effecting an intermittent rotation of the former.

The invention also contemplates the provision of a reciprocating former which is intermittently positively rotated.

It is still another object of the present invention to provide a former and a female member both positively driven and movable one relative to the other to effect the bending of the staves of a mat, and a freely rotating ring member to effect the tight contact of the staves with the former.

A further object of the invention is the provision of means for effecting a bending of the staves to the shape of a normal "straight side" or "bent bottom" basket wherein the three exterior hoops may be applied simultaneously with substantially no slippage or distortion of the staves, so that a basket of uniform capacity with securely stapled hoops including the end thereof is had without the necessity for individual stapling.

Other objects and advantages will be apparent from the following detailed description when considered in connection with the accompanying drawings wherein, Fig. 1 is a side elevation of a basket machine made in accordance with the present invention, the former being of the shape adapted for the bending of "straight side" baskets, Fig. 2 is a horizontal sectional view through the forming member carrying the rings, illustrating the bottom engaging head, Fig. 3 is a horizontal sectional view through the male forming member illustrating the operating mechanism therefor, Fig. 4 is a detailed view illustrating the manner of mounting one of the freely rotating rings, Fig. 5 is a detailed view of one of the cam and ratchet mechanisms for effecting the intermittent movement of the forming members, and Fig. 6 is a plan view of a mat of staves ready for forming into a basket in the machine illustrated in Fig. 1.

Now referring to the drawings in detail, the numeral 1 designates a base for the machine upon which is mounted a bracket 2. The bracket 2 which is preferably bolted to the base extends upwardly and is provided with bearings 3 and 4 respectively in its upper portion. A shaft 5 is journaled in the bearings 3 and 4 and has a head 6 mounted upon the inner end thereof for engaging the bottom of a basket during the course of formation, as will be hereafter described. Two semi-cylindrical sections 7 and 8 respectively are adapted to be bolted together as well as bolted to the bracket 2 in concentric relation to the head 6, these sections forming a generally internally tapering cylinder when bolted together. The upper section 7 is provided with a series of openings corresponding in number to the number of hoops to be applied to each basket. During the hoop applying operation, each stapling mechanism 9 is adapted to pass through its respective opening in section 7, and the cooperating hoop guide for each stapling mechanism is adapted to cause the respective hoop to pass through said opening.

The stapling mechanisms may be of the usual form, and in the present instant three such stapling mechanisms are illustrated. Each stapling mechanism 9 is adjustably clamped upon a horizontal bar 10. The bar 10 is in turn carried by the upper end of a vertically reciprocating rod 11. The rod 11 is formed to pass around the shaft 5 and has the lower end thereof operatively connected to a cam mechanism mounted on a driving shaft 12, which is the main driving shaft of the machine. The shaft 12 is mounted for rotation in bearings in the base.

The shaft 12 is driven through the medium of a pulley 13, over which a belt (not shown) is adapted to pass for driving the machine from a suitable source of power. Vertically arranged brackets 14 and 15 are bolted upon the base and are provided with bearings 16 and 17 respectively. A squared shaft 18 is adapted for reciprocating motion in the bearing 17, the shaft being rounded at its forward end and having mounted thereon a sleeve 19 adapted to be rotated. An inner bearing sleeve 20 is arranged in the recess portion 21 of the sleeve 19 and bears against the shaft 18 for the purpose of reducing friction during the basket forming and stapling operations. A male forming member 22 is mounted on the end of the sleeve 19 for rotation therewith, and the sleeve 19 has the forward end thereof tapered as at 23 to cause tight frictional contact between the sleeve and the former 22 when the latter is forced into position by the retaining disk 24 which is in turn maintained upon the end of the shaft 18 by means of a screw threaded bolt or other fastening element 25.

The male member 22, as shown, is of the form used to effect the bending of a mat of staves such as shown in Fig. 6, into the shape of a "bent bottom" basket. The particular shape of the basket to be manufactured dictates the shape of the former to be used, and the number of stapling mechanisms and hoop feeding devices employed will also be determined by the type of basket desired. In the form shown, the member 22 has a flange 23 at the outer end thereof which is adapted to retain the preformed interior upper hoop of the basket in the course of manufacture, the hoop being first applied over the member 22 and being abutted against the flange 23. The member 22 has a generally conical depression 26 at the inner end thereof to permit the cooperation of the head 6 therewith to effect the arching or concaving of the bottom of the baskets while being manufactured.

The member 22 is adapted to be reciprocated toward, into, and out of the cylinder formed of the semi-cylindrical sections 7 and 8. To permit the member 22 to be freely rotated together with the sleeve 19, notwithstanding the pressure applied during the basket forming operation, the shaft 18 is provided with a shoulder 27 on the rounded inner portion thereof against which a thrust bearing 28 engages. The thrust bearing 28 in turn engages against the outer end of the sleeve 19, and the sleeve 19 and the member 22 are thereby mounted for relatively free rotation upon the shaft 18 while being otherwise rigidly maintained with respect to the inner portion of said shaft.

Mechanism for effecting the reciprocation of the shaft 18 through the bearings 16 and 17, may be of the well known character. Such mechanism is diagrammatically illustrated at 29, and is shown as being arranged between the brackets 14 and 15. The mechanism 29 is ordinarily under the control of a manually operable lever 30, and it is so constructed that it will cause the reciprocation of the male member 22 into the cylinder for bending a mat of staves thereover and for forcing the mat against the head 6. The operation of the mechanism 29, will as usual maintain the staves of the mat in this bent position, while permitting a complete revolution of the head 6 and the member 22. After the revolution of the head 6 and the member 22, said member is again withdrawn to the position illustrated in Fig. 1.

Each of the series of rings 31 is mounted in an annular channel 32, which constitutes a ball race for ball bearings 33. The rings 31 are reduced in cross section as at 34 to provide grooves into which the ball bearings partially extend for the purpose of maintaining the rings in a rigid lateral position while permitting the free rotary movement thereof. Each of the annular channels 32, with the rings 31 and ball bearings 33 mounted therein are fixed in a groove arranged in the sections 7 and 8. The channels may be secured in position in the sections by first separating the same and then clamping the sections thereover, so that they will be rigidly maintained in position when the sections are bolted together.

In the operation of the mechanism thus far described a mat of staves such as illustrated in Fig. 6 is normally positioned axially with respect to the shaft 18 in front of the cylinder, a semi-circular supporting guide being mounted on the base below the inner edge of the cylinder for permitting the proper positioning of the mat in the normal way, if desired. As the male member 22 passes into the cylinder, the mat is caused to be bent around the sharp inner edge of said member, and as this former member passes further into the cylinder, the portions of the mat which are to be formed into the side walls of the basket engage against the rings 31. When the member 22 passes inwardly into the cylinder to the full extent of its reciprocating motion, the staves of the mat will be forced in close contact with the member 22 by the rings 31, and the bottom of the basket being formed will be sharply bent over the sharp edge at the inner end of the member 22, and will be further bent to a concaved shape due to the shape of the head 6. In this position the basket is ready to have the hoop applied thereto.

In the forming of the "bent bottom" basket four hoops are applied, that is inner and outer hoops at the top edge, a bottom hoop adjacent the lower sharp bent edge, and an intermediate hoop about midway of the height of the basket. The rings 31 are so positioned with respect to the stapling and hoop guiding mechanism that one hoop is applied inwardly of the innermost ring, the center or intermediate hoop is applied between the two rings, and the bottom hoop is applied outwardly of the smaller ring. By this construction the mat is securely held in frictional contact with both the head 6 and the member 22, and so closely engages the member 22 that there is no flexing of the staves during the stapling operation, but instead the staves tightly engage the member 22 permitting it to act as a clinching base for the staples.

In order to effect an intermittent rotary movement of the member 22 and the head 6 in absolute unison, and to thereby feed the hoops into position and at the same time present different staves of the basket being formed to the stapling mechanisms, a ratchet and cam mechanism is provided for the head 6 and a similar ratchet and cam mechanism is provided for the former member 22. In specifically referring to the ratchet and cam mechanism for causing the positive intermittent rotation of head 6, a cam 35 is fixed upon shaft 12 for rotation therewith. A cam band 36 engages over the cam 35 and is provided with a connecting rod 37. The connecting rod 37 is, in each instance, pivoted between the lower portions of plates 38 which are in turn pivoted to the shaft 5. A ratchet wheel 39 is mounted upon the shaft 5 and is keyed thereto for rotary movement therewith, and a dog 40 is pivoted between the upper portions of the plates 38 and is adapted to engage the teeth of the ratchet wheel 39. In some instances twenty staves are employed in the manufacture of a basket of the bushel size "bent bottom" type, and as each stave extends across the bottom and opposite sides of the basket to the upper edge thereof, forty upwardly extending ends of the staves is had. Although it is only necessary that a sufficient number of staples be used to staple the hoops firmly to the staves and secure their overlapping ends after they have been stapled around the complete circumference, usually twenty-two staples are employed in each hoop of a basket composed of a mat of twenty staves. In such an operation, and when single stapling heads are used, the ratchet wheels are each provided with twenty teeth, so that twenty stop periods will be had during the intermittent complete rotation of the head 6 and former member 22 to permit the timed reciprocation of the stapling heads in accordance with this number of stop periods. The use of the single head stapling mechanisms with the ratchet wheels effecting the twenty stop periods results in the application of twenty staples to each hoop. The well known mechanism for effecting the operation of the stapling heads is now utilized to affix two additional staples in the overlapping end of each hoop. In instances where it is desired to use stapling mechanism each with two parallel stapling heads a ratchet wheel with ten teeth will be sufficient as two spaced staples are affixed to each hoop upon the reciprocation of the stapler heads during each of the stop periods. When stapling mechanism, each with two parallel stapling heads, is employed it is only necessary in order to affix the overlapping ends of the hoops that one stroke of the mechanism be effected, since two staples will be thereby applied through the end of each hoop.

As the male member 22 is adapted to be positively intermittently rotated in unison with the head 6, the ratchet mechanism therefor is substantially identical with the ratchet mechanism for rotating the head 6. The number of teeth are the same and the ratchet wheel 39a is preferably of the same size as the ratchet wheel 39. The cam 35a is likewise mounted on shaft 12 as is cam 35. The remainder of the mechanism is the same except that the plates 38a are pivoted upon the hub of ratchet wheel 39a which has a key 41 engaging with a longitudinally arranged key slot in the sleeve 19. A bracket 43 is attached to the vertical bracket 14, and it passes over the ratchet wheel and engages against the same so that the reciprocating motion of the sleeve 19 will not cause the ratchet wheel and plates to move therewith, but instead they will be maintained in place with respect to the cam 35a and the connecting rod 37a.

From the above description it will be seen that the heavy former elements 6 and 22 are positively driven in unison, that they are intermittently driven by means of ratchet and cam mechanism operated from a common shaft, and that the stapling mechanisms effect the application of the hoops to the bent staves while the staves are maintained in the form of the completed basket, which application of the hoops by stapling is effected during the rest periods of the intermittent rotary motion. Slippage is eliminated as both members are positively driven and the weight and momentum of the members need not be taken into consideration as is the case when it is necessary to drive one of the heavy elements through the medium of the bent staves. Therefore the staves are not distorted in a manner to cause a variance in the capacity of baskets formed on the same machine and the predetermined stapling of the extreme ends of the hoops will result without the necessity for individually stapling after a given basket is removed from the machine.

The invention includes in its broader aspect the positive intermittent rotation of both the male and female members and means other than those illustrated may be utilized for this purpose. However, the specific means illustrated constitute the preferred form of the invention.

What I claim is:—

1. In a machine for making a basket or similar receptacle, the combination of a reciprocating basket former rotatably mounted and adapted to engage the inside of the receptacle, a stationary mold into which the former is movable, means rotatably mounted for effecting a pressing of the bottom of the basket being formed against the end of the former, at least one ring rotatably mounted in the mold having its inner periphery adapted to grip the outer surface of the basket, separate means for positively rotating each the former and the pressing means intermittently, means for feeding hoops to the desired position along the basket, and stapling mechanism for driving staples through the hoops and the side walls of the basket.

2. In a machine for making a basket or similar receptacle, the combination with a rotatably mounted former, of means rotatably mounted and adapted to effect the pressing of a mat of staves against the bottom of the former, means for effecting the movement of the former and pressing means toward and from one another, means for positively effecting rotation of the former intermittently, means for positively effecting rotation of the pressing means intermittently, means for feeding and stapling hoops to the staves of the mat when bent over the former during the intermittent rotation thereof, and means for bending the staves over and in close contact with the former.

3. In a machine for making a basket or similar receptacle, the combination with a pair of rotatably mounted basket clamping means, one of which constitutes a former for the basket having a concaved bottom, a freely rotatable forming ring, means for forcing the former within the ring to effect a folding of the staves of a mat thereover, the other clamping means engaging the staves of the mat at the central portion thereof to effect a concaving of the same within the bottom of the former, and means for positively rotating the pair of clamping means intermittently independently of propulsion effected through frictional contact with the basket material.

4. In a machine for making a basket or similar receptacle, the combination with a rotatably mounted basket clamp and a rotatably mounted former, of means for intermittently positively rotating the former and the clamp in unison by direct propulsion of each thereof, means for effecting reciprocal movement of the former and clamp relatively toward and away from one another, and means for feeding and stapling hoops to the staves of the mat during intermittent rotation thereof with the clamp and former.

5. In a machine for making a basket or similar receptacle the combination with a rotatably mounted former, of means rotatably mounted and adapted to effect the pressing of a mat of staves against the bottom of the former, means for effecting a relative movement of the former and pressing means toward and from one another, means for positively effecting rotation of the former intermittently, means for positively effecting rotation of the pressing means intermittently, said means for effecting rotation of the former and said means for effecting rotation of the pressing means being adapted to cause the intermittent rotaton thereof when said former and said pressing means are in their most adjacent position, and means for feeding and stapling hoops to the staves of the mat during the intermittent rotation thereof when the former and the pressing means are in the most adjacent position with the staves of the mat bent over the former.

6. In a machine for making a basket or similar receptacle the combination with a rotatable former carried on a shaft for rotation therewith, of means rotatably mounted and adapted to effect the pressing of a mat of staves against the bottom of the former, means for effecting a relative movement of the former and pressing means toward and from one another, a ratchet fixed to the shaft of the former, a dog for engaging the ratchet, cam mechanism operatively connected to the dog for effecting positive rotation of the former intermittently, a ratchet operatively connected to the pressing means, a dog for engaging the ratchet, cam mechanism operatively connected to the dog for effecting positive rotation of the pressing means intermittently, a common source of power for operating the cam mechanisms, and means for feeding and stapling hoops to the staves of the mat during the intermittent rotation thereof when the former and the pressing means are in the most adjacent position with the staves of the mat bent over the former.

7. In a machine for makng a basket or similar receptacle the combination with a rotatable former carried on a shaft for rotation therewith, of means rotatably mounted and adapted to effect the pressing of a mat of staves against the bottom of the former, means for effecting a reciprocating motion of the former toward and from the pressing means, a ratchet fixed to the shaft of the former, a dog for engaging the ratchet, cam mechanism operatively connected to the dog for effecting positive rotation of the former intermittently, means for retaining said ratchet fixed against reciprocating motion with the former, a ratchet operatively connected to the pressing means, a dog for engaging the ratchet, cam mechanism operatively connected to the dog for effecting positive rotation of the pressing means intermittently, a common source of power for operating the cam mechanisms, and means for feeding and stapling hoops to the staves of the mat during the intermittent rotation thereof when the former and the pressing means are in the most adjacent position with the staves of the mat bent over the former.

In testimony whereof I affix my signature.

JOHN J. BACON.